Patented May 10, 1932

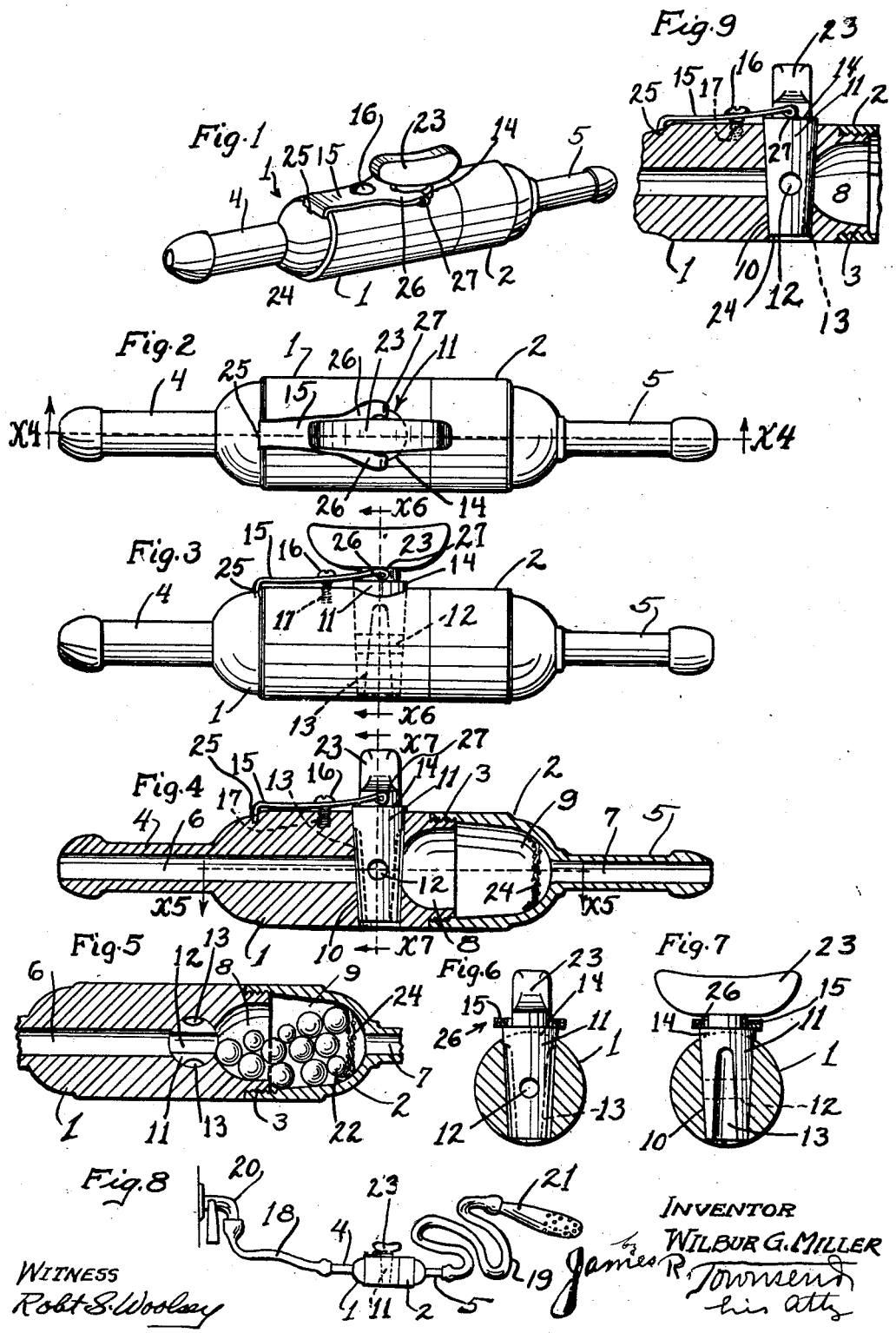

1,858,054

UNITED STATES PATENT OFFICE

WILBUR G. MILLER, OF LOS ANGELES, CALIFORNIA

MULTIPLE-WAY BY-PASS VALVE

Application filed February 2, 1927, Serial No. 165,348. Renewed September 30, 1931.

This invention is applicable to various uses, but is more particularly intended for use in a temperature and pressure testing and regulating connection between two sections of a douche tube for the purpose of affording a convenient and comfortable means by which a delicate person may, with convenience and comfort test and adjust the pressure and temperature of water from a hot-and-cold water union-bath-tub or wash-bowl faucet before admitting the water to the douche nozzle for taking a douche; and an object is to make a non-leaking valve of such character, which, in one position may be made to cut off the stream between the faucet and the douche nozzle and allow water from the faucet to flow from the connection at the valve, so that a delicate patient intending to use the douche can hold the connection in one hand and allow the water to flow through or onto such hand from the side of the connection while adjusting the hot-and-cold water valves of the faucet relative to each other to bring to a desired temperature and pressure the water from the faucet, before turning it onto the douche nozzle, and off from the testing outlet of the connection.

Lightness, cheapness and ease of operation are features of the invention.

The invention relates to a valve barrel having a screw threaded socket and a taper valve plug seat, a taper valve plug in such seat, said plug having a bearing at the larger end; a spring lever arranged with one end resting on the barrel and the other end resting on said bearing, and a screw extending through and journalled in the spring and screwed into the socket, having a head to act on the spring to cause it to press the taper plug into its taper seat in said barrel.

Said barrel is provided with a longitudinal way comprising an inflow bore and an outflow bore, and the plug is provided with a transverse passage which is adapted and arranged to be closed by the walls of the plug seat when the plug is turned to one position, and is arranged to connect the inflow bore with the outflow bore of the barrel when the plug is turned to another position; and said plug is provided with an external groove to form a lateral outlet from the inflow bore to the outside of the face when the plug is turned to cut off the flow through the plug, and such groove is midway between the ends of the way so it will be open to the inflow and allow the water to flow laterally from the barrel when the way through the plug is closed by the sides of the valve seat.

The invention is applicable to valved douche connections in which a chamber is formed between two separable members for the purpose of introducing antiseptic or medicinal substances into the water passing through the connection as it passes toward the douche nozzle.

An object is to provide a valved connection of the character set forth which is free from projections that might hurt or injure a delicate hand holding the connection while adjusting the plug to direct the stream through the nozzle or through the lateral outlet.

Another object is to provide cheap and convenient means for adjusting the valve plug in its seat to secure the required tightness of valve with a desired minimum resistance to turning the plug.

In this invention I provide a lever spring bent at one end to form a tang, and bifurcated at the other end to extend on opposite sides of the valve plug and provided with rounded bearing tips extending from the same side of the spring as the tang to press on the bearing shoulder of the plug on opposite sides of the neck of the plug to evenly press the plug into its seat.

Other objects, advantages and features of invention may appear from the accompanying drawings, the subjoined detailed description and the appended claims.

The accompanying drawings illustrate the invention applied as a douche valve.

Figure 1 is a perspective view showing a douche valve constructed in accordance with this invention with plug in position for applying antiseptics or medicaments to the douche water.

Fig. 2 is a view on a larger scale, of the device shown in Fig. 1, looking directly at the plug and thumb piece and the plug tightening spring.

Fig. 3 is a side elevation of what is shown in Figs. 1 and 2, and indicates in broken lines the construction of the plug body.

Fig. 4 is a sectional view on line x4, Fig. 2, the spring and plug being shown intact, and the plug in testing position.

Fig. 5 is a section on line x5, Fig. 4, with plug in douche position and an antiseptic charge in place.

Fig. 6 is a cross-section on line x6, Fig. 3, showing the plug intact.

Fig. 7 is a section on line x7, Fig. 4, showing the plug intact.

Fig. 8 is a view of the valve showing a douche applicator in which the invention is embodied.

Fig. 9 is a fragmental view showing the plug with only one groove and turned to prevent flow from the inflow bore.

The douche tube connection in which the valve is shown, comprises a body or barrel having two parts 1, 2, fastened together by a screw joint 3 and terminating respectively in nipples 4, 5, and containing inflow and outflow bores 6, 7 and cavities 8, 9 to form a chamber when the parts 1 and 2 are screwed together. The main body 1 is provided with a taper valve seat 10 extending through said body 1 and open to the inflow bore 6 and to the receiving cavity 8 of said chamber; and the taper valve plug 11 fitted to the valve seat 10 is provided with a transverse passage 12 and with one or more longitudinal grooves 13; which passage 12 is adapted to be open to the inflow bore 6 when the valve plug is turned to one position; and to be closed by the side walls of the valve seat when the valve plug is turned to another position; and the grooves 13 are arranged to be opened to the inflow bore 6 when the valve plug is turned with the transverse passage 12 closed by conjunction of the plug and the side walls of said plug seat.

The taper portion of the valve plug is preferably about equal in length to the diameter of the body portion 1 of the connection, and said plug is of such diameter that its larger end 14 protrudes from the body 1 when the valve plug is firmly seated in its seat, and the top of said larger end 14 is constructed to form a bearing upon which the free end tip of a leaf spring 15 is made to press by means of a set screw 16 journalled in the spring and screwed into a threaded seat 17 in the body 1. The other end tip of said spring rests upon the barrel and the spring is spaced from the barrel from tip to tip.

In practical use the hose sections 18 and 19 are applied to the nipples 4 and 5 as indicated in Fig. 8 and this may be done while the two members 1 and 2 are apart, or while they are screwed together.

The tube or hose section 18 may be applied to the hot and cold water faucet 20 and the douche nozzle 21 may be applied to the end of the hose section 19.

An antiseptic or medicinal charge 22 may be placed in the cavity 9, and the parts 1 and 2 screwed together, and the thumb piece 23 will be turned transverse to the inflow bore 6 and water will be turned on at the faucet 20 and the hot and cold water valves will be manipulated to adjust the pressure and temperature of the water as the same issues from the bypass 13 and is tested by the hand holding the connection formed by the members 1 and 2.

When the proper temperature has been reached, the douche nozzle may be applied with one hand while the other hand is used to turn the thumb piece 23 to discharge the water through the chamber formed by the cavities 8 and 9 and thence through the douche nozzle to the place where the douche is to be applied.

The water passing through the chamber dissolves the readily soluble medicament or antiseptic and the operation may be continued until complete discharge of the dissolved substance has been effected; and the water may be shut off at the hot and cold faucet 20, or the flow of clear water may be continued as desired, or the plug may be turned to shut off the water from the nozzle and allow it to discharge through the bypass 13.

A screen 24 in front of the outflow bore 7, is shown in the drawings to retain the undissolved medicament or antiseptic substance in the chamber formed by the cavity.

One end of the leaf spring 15 is bent to form a fulcrum 25 and the other end is bifurcated as at 26 and the ends of the furcations are bent under and rounded as at 27 to press upon opposite sides of the large end 14 of the plug so that when the screw 16 is screwed down the plug is jammed tightly into place to cause its head to press the center of the leaf spring toward the barrel, thus the rounded ends of the furcations 27 apply a balanced endwise pressure in opposite sides of the larger end of plug to hold the plug tight.

I claim:—

1. In combination, a valve barrel having a screw threaded socket and a taper valve-plug seat, a taper valve plug in such seat, said plug having a bearing at its larger end; a spring lever arranged with one end resting on the barrel and the other end tip resting on said bearing, and spaced from the barrel between said ends and from said socket; and a screw extending through and journalled in the spring and screwed into said socket and having a head to act on the spring to cause it to variably press the taper plug into its taper seat in said barrel.

2. A valve body having a transverse open end taper valve-plug seat and a way open to said seat on the opposite sides thereof, a taper valve plug adapted to fit said seat; a spring lever adjustably connected to said body and arranged to force the taper plug into the taper seat, and a set screw extending through the spring and screwed into said body and having a head to act upon the spring to apply a variable tension thereon; said spring being free between its ends so that it will yield to the head thereby allowing the variable pressure of the spring to act variably upon the plug.

3. The combination with a valve body having a taper plug seat; of a taper plug seated in said seat and having a bearing on its larger end; a bifurcated spring connected medially to said valve body and arranged to bear with one of its ends on said body and with the tips of its furcations on the bearing end of the valve plug, on opposite sides of the axis thereof; said spring being spaced from the body between its ends; and means to act on the spring between the ends thereof to produce pressure to seat the taper valve plug in the taper valve seat with a variable pressure.

In testimony whereof, I have hereunto set my hand at Los Angeles, California, this 6th day of January, 1927.

WILBUR G. MILLER.